Patented Dec. 28, 1948

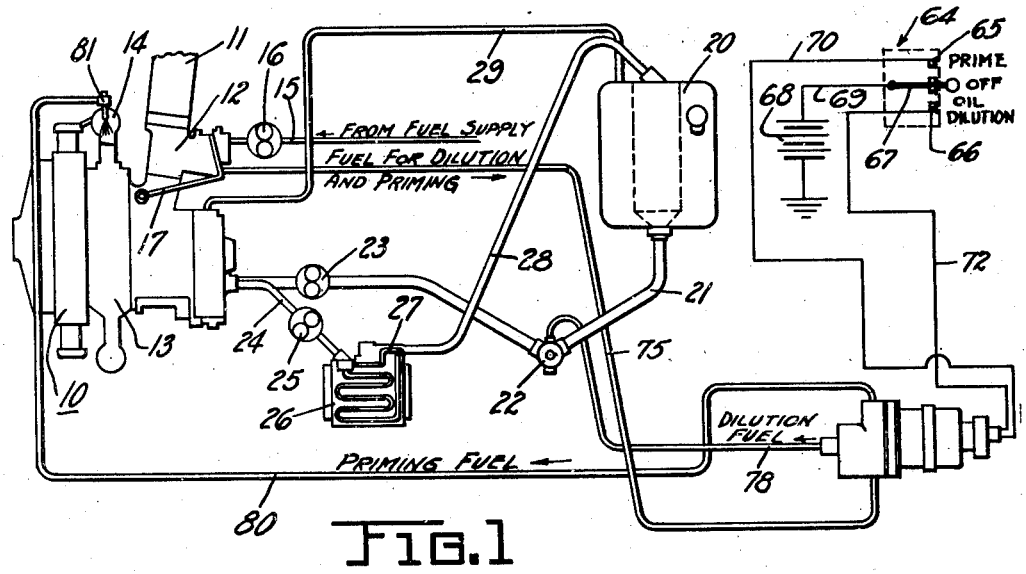
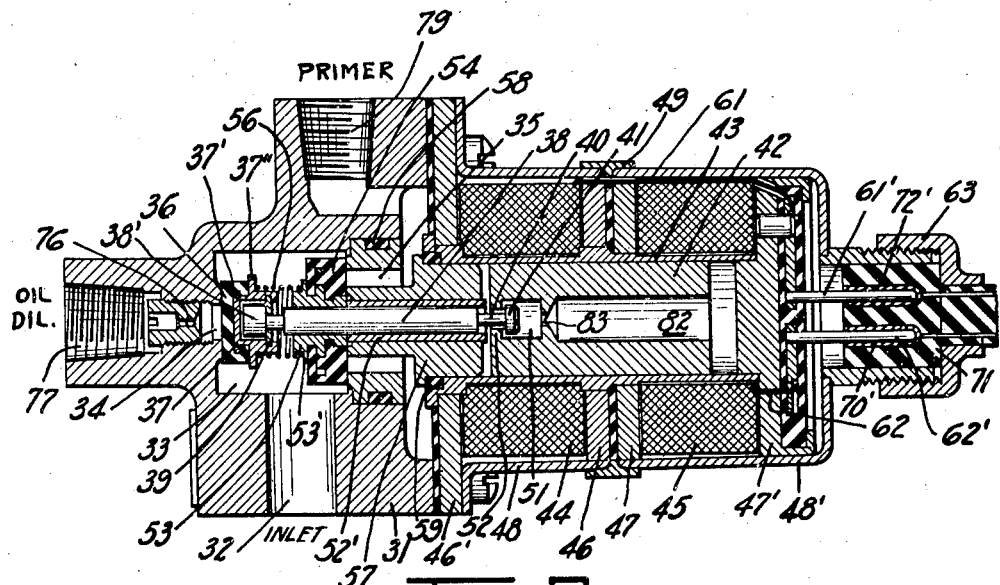

2,457,739

UNITED STATES PATENT OFFICE 2,457,739

OIL DILUTION AND PRIMER SYSTEM FOR INTERNAL-COMBUSTION ENGINES

Eugene A. Sherrill, South Bend, Ind., assignor to Bendix Aviation Corporation, South Bend, Ind., a corporation of Delaware Application April 19, 1946, Serial No. 663,300

14 Claims. (Cl. 123—180)

This invention relates to an oil dilution and primer system for internal combustion engines, particularly engines for aircraft, and has for an object to coordinate the functions of an engine primer and an oil dilution device whereby the duties of an operator or pilot are facilitated and the parts and interconnecting piping for carrying out these respective functions may be relatively light in weight, arranged compactly and occupy a minimum of space in the region adjacent the engine usually allotted for accessories.

Another object is to provide an oil dilution and primer system of the electric type which involves a minimum number of parts and at the same time is reliable in operation.

A further object is to generally simplify and reduce the cost of initial construction as well as maintenance of oil dilution and priming systems as heretofore known.

The foregoing and other objects and advantages will become apparent in view of the following description taken in conjunction with the drawing, wherein:

Figure 1 is a schematic diagram of a fuel and oil supply system for an internal combustion engine incorporating the present invention;

Figure 2 is an enlarged central longitudinal sectional view of the combined oil dilution and primer valve shown in the lower right hand corner of Figure 1.

Referring to the drawing in detail, an internal combustion engine of the type commonly used in aircraft is generally indicated at 10 and is provided with an air intake and fuel supply system including an induction conduit 11, carburetor 12 and a supercharger 13 discharging into supercharger ring or intake manifold 14. The carburetor may be of any suitable type, that here shown being supplied with fuel through conduit 15 having a fuel pump 16 therein, and metered fuel from the carburetor being conducted to the induction conduit by means of a pipe 17. Also, fuel may be supplied to the engine cylinders by a so-called speed-density pump, direct injection or otherwise, it only being necessary to have a source of fuel under pressure.

The oil supply system shown for the purposes of illustration includes an oil tank or receptable 20, from which oil may flow through pipe or conduit 21 having an oil sump or drain 22 therein and an oil pump 23, which forces oil under pressure to the various bearings and running parts of the engine. Scavenged oil is taken from the engine through pipe line 24 having a scavenger pump 25 therein, the oil being passed through a suitable cooler 26 provided with a by-pass 27 for cold oil, thence passing by way of pipe 28 back to the oil tank 20. A vent line 29 connects the engine with the top of the oil tank for conducting oil vapor resulting from operation of the engine back to the tank.

At the lower right hand corner of Figure 1 is an oil dilution and primer valve, the said valve being shown in enlarged section in Figure 2. The valve in its preferred form is of the electrical type and comprises a body member 31 provided with a fuel inlet passage 32 leading to a fuel chamber 33 having a pair of fuel discharge ports 34 and 35. The port 34 is for oil dilution fuel and is controlled by a valve member 36 carried by a bushing 37 provided with flanges 37' and 37", the flange 37' providing a retainer for the valve member 36, which may be of molded synthetic rubber or other suitable material. A plunger or armature extension 38 has an enlargement 38' inserted in the bushing 37 and is secured thereto by a split plate or retainer washer 39, the opposite end of said plunger being provided with a necked portion or stem 40 terminating in a head 41.

The plunger 38 has a lost motion connection with an armature 42 mounted to reciprocate in a sleeve or bushing 43 providing a magnetic core piece. A pair of solenoid coils 44 and 45 are mounted around the bushing 43 and have their contiguous ends spaced from one another by members 46 and 47. At the outer end of coil 45 is a retaining and sealing cap 47', while at the outer end of coil 44 is a member 46', both or either of which may be made of magnetic material. A flanged housing or cover encloses the coils and is suitably insulated therefrom, said cover being made up of two parts 48, 48' connected by an insulated ring 49, to facilitate assembly.

The plunger 38 has its head 41 mounted for limited movement in a chamber 51 formed in the armature 42, and the latter is provided with a flange 52 adapted to engage the head 41 when the armature moves to the right as shown in Figure 2, and to engage a slidable sleeve or bushing 52' when the armature moves to the left as viewed in said figure. The sleeve or bushing 52' at its left-hand end is adapted to engage the adjacent end of a valve body 53 provided with a series of radial flanges to facilitate securement thereon as by molding of a valve member 54 adapted to control the valve port 35. A spring 56 is interposed between the flange 37" of the valve body 37 and a flange 53' formed on the valve body 53, said spring being of sufficient strength to seat the valve members 36 and 54 with enough force to prevent leakage of fuel through the ports 34 and 35 when the said valve members are closed. The sleeve 52' is supported by a bushing 57, which is drilled at spaced points around the center thereof to form the valve ports 35, the said bushing 57 also being provided with peripheral seal rings 58 and 59.

The coil 44 may be termed the "oil dilution coil" and has connected thereto the one end of a conductor 61, the opposite end of said conductor being in the form of a terminal 61'; and the coil 45 may be termed the "primer coil" and has connected thereto the one end of a conductor 62 whose opposite end constitutes a terminal 62', said terminals projecting into a socket which may be externally threaded for a plug anchoring or retainer member 63.

A switch 64 is provided within convenient reach of a pilot or operator and includes contacts 65 and 66 and a pivoted switch lever 67. Current may be conducted to the lever 67 from any suitable source, for instance a battery 68 having a lead wire or cable 69. A wire 70 connects the contact 64 with a terminal 70' carried by an electrical plug 71; and another wire 72 connects the contact 66 with a terminal 72' carried by said plug. The terminal 70' makes contact with the terminal 62' of the primer coil 45 and the terminal 72' makes contact with the terminal 61' of the oil dilution coil 44.

Fuel for oil dilution and priming may be taken from the fuel system, as for example from the unmetered fuel supply under pump pressure, by way of a pipe line 75 which communicates with the intake passage 32 of the oil dilution and primer valve, and from which the fuel passes into the chamber 33. If the valve 36 is open, oil dilution fuel may escape from the chamber 33 by way of calibrated metering orifice 76 and thence by way of passage 77 and pipe line 78 to the oil conduit 21 and thence into the engine; and if the valve 54 is open, fuel from the chamber 33 may escape through valve port 35 and passage 79 and may then flow by way of pipe line 80 and be discharged into the intake manifold 14 through nozzle 81.

The armature 42 is formed with a center bore 82 which communicates with chamber 51 by means of a hole or port 83 which may be calibrated to provide in effect a dashpot arrangement, viz., a restricted flow passage connecting the clearance spaces at opposite ends of the armature. The purpose of this arrangement is to prevent "jiggling" of the armature due to vibration when the solenoid is idle and to dampen and steady the armature when the solenoid is operating. Thus, when the armature is suddenly moved in either direction, fluid entrapped in the clearance spaces at opposite ends of the armature and in the bore 82, passes through restriction 83, which should be of suitable flow capacity to permit proper movement of the armature. The fluid may be air, fuel or oil, as desired.

The operation is as follows:

The oil dilution and priming fuel in valve chamber 33 is constantly maintained under pressure as determined by the pressure of the supply pump in the fuel system. Assuming an operator or pilot desires to dilute the oil just prior to stopping the engine to facilitate subsequent starting under low temperature conditions, he moves the switch lever 67 into engagement with the contact 66, whereupon current is conducted from the battery through said switch and thence through wire 72 and terminals 72' and 61' to the solenoid coil 44. Energization of this coil moves the armature 42 to the right as viewed in Figure 2, whereupon the flange 52 of the armature engages the head 41 of the plunger 39 and the latter unseats the valve 36 against the resistance of the spring 56. When this valve is unseated, fuel for oil dilution passes from the chamber 33 through restriction 76, passage 77 and pipe line 78 to the engine by way of the conduit 21.

Should the pilot desire to prime the engine during cranking, he simply moves the switch lever 67 into engagement with the contact 65, whereupon current flows from the battery through the switch, thence through wire 70, terminals 70' and 62' to the coil 45. Energization of this coil moves the armature 42 to the left as viewed in Figure 2, whereupon the flange 52 abuts the slidable sleeve or bushing 52', causing the latter to unseat the valve member 54. When this latter valve is opened, priming fuel may pass by way of port 35, passage 79 and pipe line 80 to the nozzle 81, which discharges into the intake manifold or supercharger ring 14.

The oil dilution and primer valve constitutes a single compact unit which may be installed with less weight, less piping and wiring connections than where two separate units are used; thereby also reducing the number of accessories and accessory connections which take up valuable space in engine installations for aircraft.

It will be understood that certain changes in construction and design may be adopted, depending upon the nature of the installation, such changes being within the scope of the invention as defined by the appending claims.

I claim:

1. For use with an engine having an oil supply system and a fuel supply system, means defining a chamber adapted to receive oil dilution and engine priming fuel from the fuel supply system, separate outlets leading from said chamber, one for fuel to be conducted to the engine for priming purposes and the other for fuel to be conducted to the oil supply system for oil dilution purposes, and means for selectively controlling the escape of fuel from said chamber through said outlets.

2. For use with an engine having a pressure oil supply system and a fuel supply system, means defining a valve chamber having an inlet passage for engine priming fuel and oil dilution fuel from the fuel supply system, separate passages leading from said chamber, one for conducting fuel to the engine for priming purposes and another for conducting oil to the oil supply system for oil dilution purposes, valve means controlling the passage of fuel from said chamber through said passages, and means for selectively actuating said valve means.

3. For use with an engine having an oil supply system and a fuel supply system, a combined oil dilution and engine priming valve having a chamber adapted to receive fuel from the fuel supply system, separate valve ports through which fuel may escape from said chamber, separate valve members controlling said ports, and common means for selectively actuating said valve members independently of one another.

4. For use with an engine having an oil supply system and a fuel supply system, a combined oil dilution and priming valve having a valve chamber adapted to receive fuel from the fuel supply system, separate outlets leading from said chamber, separate valve members controlling said outlets, and means common to both of said valve members for selectively actuating the latter, said means being arranged to maintain one valve member seated while unseating the other.

5. For use with an engine having an oil supply system and a fuel supply system, combined oil dilution and engine priming means comprising a valve chamber adapted to receive fuel from the fuel supply system, separate discharge ports controlling the escape of fuel from said chamber, a solenoid valve including coacting valve members controlling said ports, an armature having an operative connection with said valve members, and electro-magnetic means arranged to impart selective valve-actuating movements to said armature.

6. For use with an engine having an oil supply system and a fuel supply system, combined oil dilution and engine priming means comprising a valve chamber adapted to receive fuel from the fuel supply system, separate discharge ports controlling the escape of fuel from the said chamber, a solenoid valve having a pair of valve members controlling said ports and an armature having an operative connection with said valve members, electro-magnetic means arranged to impart selective movement to said armature, the connection between the armature and said valve members being such that when the armature is moved in one direction it unseats one of said valve members and when it is moved in the opposite direction it unseats the other of said valve members.

7. For use with an engine having an oil supply system and a fuel supply system, combined oil dilution and engine priming means comprising a valve chamber adapted to receive fuel from the fuel supply system, separate discharge ports through which fuel may escape from said chamber, a solenoid valve including a pair of spring-biased valve members controlling said ports and electro-magnetic means for unseating said valve members including a reciprocating armature and means connecting said armature to the valve members, said connecting means comprising a movable element having a lost motion connection with said armature and adapted to unseat one of said valve members when the armature is moved in one direction and another movable element adapted to engage and unseat the other of said valve members when the aramture is moved in the opposite direction.

8. For use with an engine having an oil supply system and a fuel supply system, combined oil dilution and priming means comprising a valve chamber adapted to receive fuel from the fuel supply system, separate discharge ports through which fuel may escape from said chamber, a solenoid valve including a pair of spring biased valve members controlling said ports, a solenoid having a reciprocating armature and electro-magnet coils of opposite polarity arranged to impart reciprocatory movement to the armature, means operatively connecting said armature to said valve members, said connecting means including a reciprocating element having a lost motion connection with said armature and adapted to unseat one of said valve members when the armature is moved in one direction, and another reciprocating element adapted to engage the other of said valve members and unseat the latter when the armature is reciprocated in the opposite direction within the range of said lost motion connection, and an electric circuit including a switch for selectively energizing said coil.

9. For use with an engine having an oil supply system and a fuel supply system, combined oil dilution and engine priming means comprising a valve chamber adapted to receive fuel from the fuel supply system, a pair of discharge ports through which fuel may escape from said chamber, a solenoid valve including a pair of valve members controlling said ports, a spring biasing said valve members to seated position, a reciprocating armature and electro-magnet coils of opposite polarity arranged to impart reciprocatory movement to said armature, means operatively connecting said armature to said valve members whereby when said armature is moved in one direction it unseats one of said valve members and when it is moved in the opposite direction it unseats the other of said valve members, and an electric circuit including an electric switch for selectively energizing said coils.

10. For use with an engine having an oil supply system and a fuel supply system, combined oil dilution and engine priming means comprising a valve chamber adapted to receive fuel from the fuel supply system, a pair of discharge ports through which fuel may escape from said chamber, a solenoid valve including a pair of valve members controlling said ports, a spring biasing said valve members to seated position, a reciprocating armature and electro-magnet coils of opposite polarity arranged to impart reciprocatory movement to said armature, means operatively connecting said armature to said valve members whereby when said armature is moved in one direction it unseats one of said valve members and when it is moved in the opposite direction it unseats the other of said valve members, and an electric circuit including an electric switch for selectively energizing said coils, said valve members and valve ports being arranged substantially in alignment and said spring being disposed between said valve members normally urging them towards seated position.

11. For use with an engine having an oil supply system and a fuel supply system, a combined oil dilution and engine priming means comprising a valve chamber adapted to receive fuel from the fuel supply system, a pair of discharge ports arranged in substantial alignment through which fuel may escape from said chamber, a solenoid valve including a pair of aligned valve members arranged to control said ports, spring means disposed between said valve members normally urging them towards seated position, an electrical armature, solenoid coils of opposite polarity insulated from one another and arranged to move said armature in opposite directions upon energization thereof, a reciprocating element operatively connecting one of said valve members to said armature and having a lost motion connection with the latter in a manner such that when the armature is moved a predetermined distance in one direction it engages said element and unseats one of said valve members, another reciprocating element arranged to be engaged by said armature within the range of movement permitted by said lost motion connection and unseat the other of said valve members, and switch means for selectively energizing said coils.

12. In combination with an engine having an intake manifold, an oil supply system and a fuel supply system, a priming nozzle arranged to discharge priming fuel into said manifold, oil dilution and engine priming means including a chamber adapted to receive fuel from the fuel supply system, separate valve ports through which fuel may escape from said chamber, a conduit communicating one of said ports with said priming nozzle and another conduit communicating the other of said ports with the oil supply system, valve members controlling said ports, and means for selectively actuating said valve members.

13. In combination with an engine having an intake manifold, an oil supply system and a fuel supply system, a priming nozzle arranged to discharge priming fuel into said manifold, oil dilution and engine priming means including a chamber adapted to receive fuel from the fuel supply system, separate valve ports through which fuel may escape from said chamber, a conduit communicating one of said ports with said priming nozzle and another conduit communicating the other of said ports with the oil supply system, valve members controlling said ports, and means for selectively actuating said valve members, said oil dilution conduit having a metering restriction therein.

14. In combination with an engine having an intake manifold and oil supply system, means defining a chamber for oil dilution and priming liquid, valve ports through which liquid may escape from said chamber, a conduit communicating one of said ports with the intake manifold and another conduit communicating another of said ports with the oil supply system, valve members controlling said ports, and means for selectively actuating said valve members.

EUGENE A. SHERRILL.

REFERENCES CITED

The following references are of record in the file of this patent:

UNITED STATES PATENTS

| Number | Name | Date |
| --- | --- | --- |
| 1,090,827 | Lipman | Mar. 17, 1914 |
| 1,794,531 | Newell | Mar. 3, 1931 |
| 2,184,413 | Della Chiesa et al. | Dec. 26, 1939 |
| 2,196,120 | Parker | Apr. 2, 1940 |
| 2,373,142 | Owen | Apr. 10, 1945 |
| 2,407,184 | Sparrow | Sept. 3, 1946 |

FOREIGN PATENTS

| Number | Country | Date |
| --- | --- | --- |
| 269,641 | Great Britain | 1927 |